(12) United States Patent
Vuille et al.

(10) Patent No.: US 12,235,610 B2
(45) Date of Patent: Feb. 25, 2025

(54) METHOD FOR MANUFACTURING AN ORNAMENTAL HARD MATERIAL PART PROVIDED WITH A POLYMER COATING

(71) Applicant: Comadur SA, Le Locle (CH)

(72) Inventors: Pierry Vuille, Les Emibois (CH); Denis Bubendorf, Bevaix (CH); Paulo Arede, La Chaux-de-Fonds (CH); Johan Romand, Mamirolle (FR)

(73) Assignee: Comadur SA, Le Locle (CH)

( * ) Notice: Subject to any disclaimer, the term of this patent is extended or adjusted under 35 U.S.C. 154(b) by 330 days.

(21) Appl. No.: 17/320,613

(22) Filed: May 14, 2021

(65) Prior Publication Data

US 2021/0389729 A1    Dec. 16, 2021

(30) Foreign Application Priority Data

Jun. 12, 2020  (EP) .................................. 20179649

(51) Int. Cl.
*B28B 1/26*    (2006.01)
*A44C 27/00*   (2006.01)
(Continued)

(52) U.S. Cl.
CPC .......... *G04B 37/223* (2013.01); *A44C 27/007* (2013.01); *B28B 1/26* (2013.01);
(Continued)

(58) Field of Classification Search
CPC ........ B29C 45/14336; B29C 2793/009; G04B 37/223; G04B 37/225
(Continued)

(56) References Cited

U.S. PATENT DOCUMENTS

| 6,213,635 B1    | 4/2001  | Savy et al.   |
| 2009/0245032 A1 | 10/2009 | Bonnet et al. |

(Continued)

FOREIGN PATENT DOCUMENTS

| CN | 1185599 A | 6/1998 |
| CN | 1256765 A | 6/2000 |

(Continued)

OTHER PUBLICATIONS

European Search Report issued Nov. 26, 2020 in European Application 20179649.7 filed Jun. 12, 2020 (with English Translation of Categories of Cited Documents), 3 pages.
(Continued)

*Primary Examiner* — Jeffrey M Wollschlager
*Assistant Examiner* — Xue H Liu
(74) *Attorney, Agent, or Firm* — Oblon, McClelland, Maier & Neustadt, L.L.P.

(57) ABSTRACT

An ornamental part, for example for a timepiece, jewellery or telephone, in particular a watch case middle, and its manufacturing method, the part at least partly including a hard material having a Vickers hardness greater than 1000 HV, the method including the following main steps: a step of producing a precursor from a mixture of at least one powder material with a binder, a step of injecting the precursor into a mould in order to form a green body, a step of sintering the green body in order to form a body of the future part from the hard material, and a step of depositing a polymer material coating on one face of the part, the deposition being carried out by moulding on the body, in particular by injection into a mould, the coating and the hard material being inseparable.

6 Claims, 3 Drawing Sheets

(51) Int. Cl.
*C09D 169/00* (2006.01)
*G04B 37/22* (2006.01)
*G04B 39/00* (2006.01)

(52) U.S. Cl.
CPC ......... *C09D 169/00* (2013.01); *G04B 37/225* (2013.01); *G04B 39/00* (2013.01)

(58) Field of Classification Search
USPC ........................................................ 264/162
See application file for complete search history.

(56) References Cited

U.S. PATENT DOCUMENTS

| | | | |
|---|---|---|---|
| 2014/0192626 A1* | 7/2014 | Wolff | G04G 13/025 368/185 |
| 2017/0038734 A1 | 2/2017 | Issartel et al. | |
| 2020/0061954 A1* | 2/2020 | Francois | B32B 15/08 |

FOREIGN PATENT DOCUMENTS

| | | | |
|---|---|---|---|
| CN | 103722172 A | | 4/2014 |
| CN | 104136232 A | | 11/2014 |
| CN | 106462106 A | | 2/2017 |
| EP | 1 906 268 A1 | | 4/2008 |
| EP | 2 070 695 A1 | | 6/2009 |
| EP | 3260932 A1 | | 12/2017 |
| JP | 4-354839 A | | 12/1992 |
| JP | 2001-522498 A | | 11/2001 |
| JP | 2006212340 A | * | 8/2006 |
| WO | WO 99/44104 A1 | | 9/1999 |
| WO | WO 2015/150552 A1 | | 10/2015 |

OTHER PUBLICATIONS

Korean Office Action issued Sep. 21, 2022 in Korean Patent Application No. 10-2021-0075739 (with English translation), 12 pages.
Korean Office Action issued Apr. 27, 2023 in Korean Patent Application No. 10-2021-0075739 (with English Translation), 8 pages.
Japanese Office Action issued Jul. 5, 2022 in Japanese Patent Application No. 2021-088995 (with English translation), 9 pages.
Chinese Office Action and Search Report issued on Sep. 5, 2022 in Chinese Patent Application No. 202110653743.9 (with English Translation), 16 pages.
Combined Chinese Office Action and Search Report issued Apr. 29, 2023 in Patent Application No. 202110653743.9 (with English language translation and English translation of Category of Cited Documents), 17 pages.

\* cited by examiner

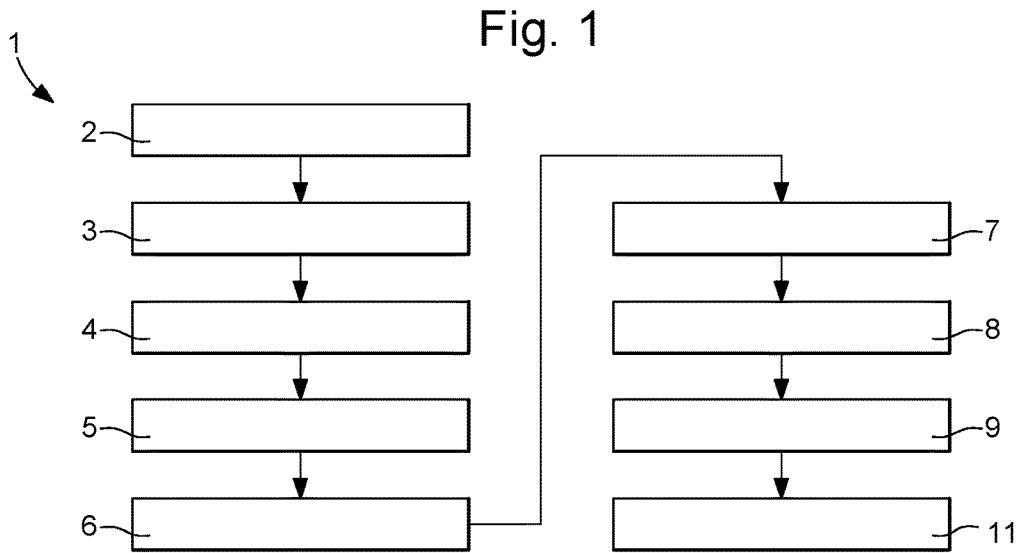
Fig. 1
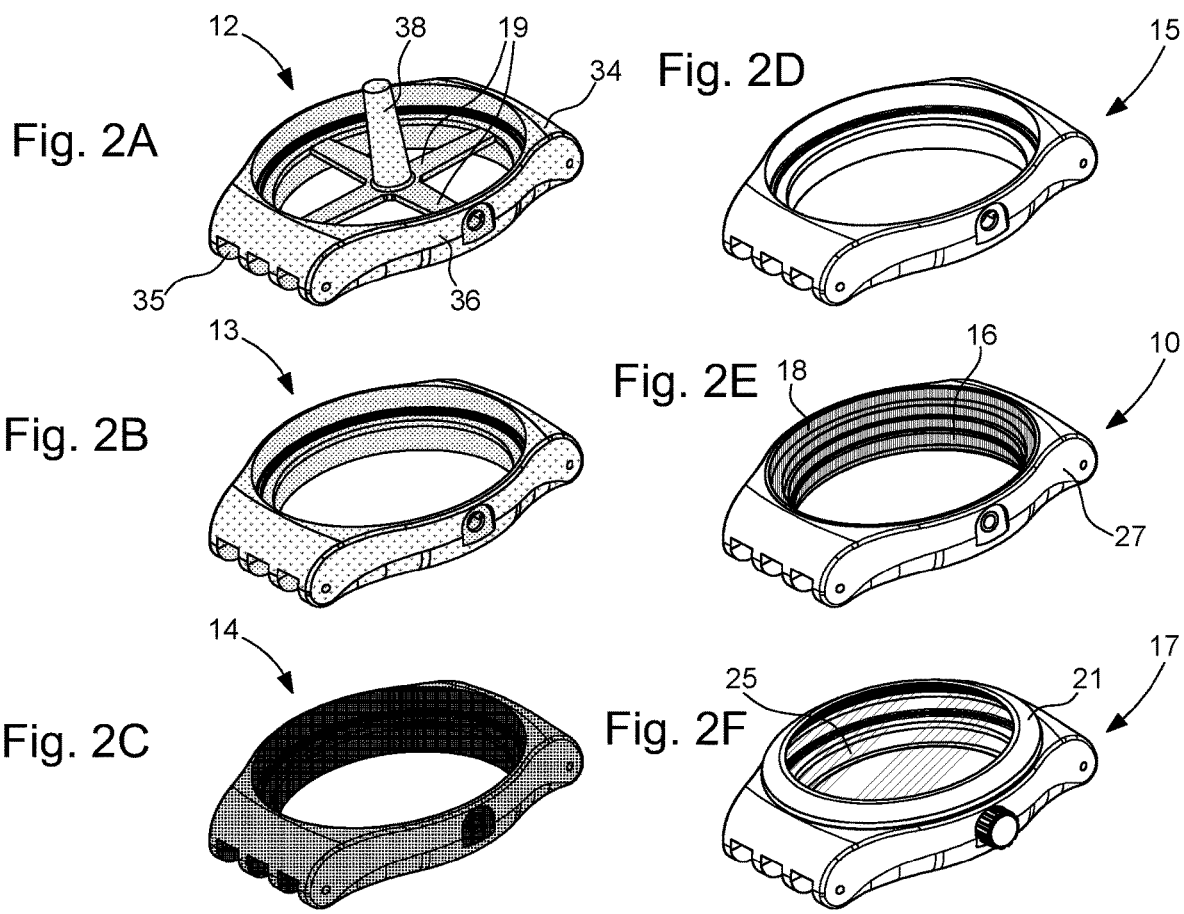

METHOD FOR MANUFACTURING AN ORNAMENTAL HARD MATERIAL PART PROVIDED WITH A POLYMER COATING

TECHNICAL FIELD

The invention relates to the field of manufacturing ornamental parts, in particular in watchmaking, jewellery or telephony, the part being made of a hard material with a polymer coating. It relates more specifically to a method for manufacturing a watch middle provided with a polymer coating of the inner face.

TECHNOLOGICAL BACKGROUND

In the watchmaking and jewellery industry, various materials are used for the manufacture of cases or bracelets of various appearances. It is in particular known to manufacture timepieces, in particular watch cases, from hard material. Hard material means materials having a Vickers hardness greater than 1000 HV. Such hard materials are, for example, ceramic, silicon nitride, zirconium oxide, sapphire, or alumina.

In watchmaking, they are used for their mechanical properties, in particular because they are difficult to scratch. They are used, for example, to manufacture parts such as watch middles or bracelet links.

The ornamental parts are obtained after an injection step giving the desired shape to the part, then by a sintering step to harden the material.

However, this type of injection method does not allow to obtain sufficiently precise dimensions. For example, for the middle of a watch, it is needed to have housing dimensions that allow a crystal, a bezel, or a back to be pressed in such a way as to be held firmly. There is also a need to drill holes for a crown or push-pieces, which cannot be obtained with the injection method.

To achieve this, it is necessary to machine the middle to correct the dimensions of the middle. However, hard materials are difficult to machine because of their hardness. To this end, diamond tools with a short lifetime are used, which generate significant costs.

SUMMARY OF THE INVENTION

It would be advantageous to obtain an ornamental hard material part, which requires little or no machining on the hard material, in particular for ceramic materials, but which comprise functional surfaces.

The present invention provides this type of method. Thanks to the combination of a hard material and a coating of polymer material, the method allows to avoid the direct machining of the hard material on the faces of the part. Polymer is easier to machine than hard material. Thus, the cost of manufacturing the part is reduced by avoiding machining the hard material as much as possible. Furthermore, the water resistance of the part is ensured between the coating and the hard material.

More specifically, the invention relates to a method for manufacturing an ornamental part, for example for a timepiece, jewellery or telephone, in particular a watch middle, the part at least partially comprising a hard material having a Vickers hardness greater than 1000 HV. According to the invention, the method comprises the following main steps:
- a step of producing a precursor from a mixture of at least one powder material with a binder,
- a step of injecting the precursor into a mould in order to form a green body,
- a step of sintering said green body in order to form a body of the future part from said hard material, and
- a step of depositing a polymer material coating on one face of the part, the deposition being carried out by moulding on the body, in particular by injection into a mould, the coating and the hard material being inseparable.

According to a particular embodiment of the invention, the method comprises an additional step of machining the polymer material coating.

According to a particular embodiment of the invention, the method comprises an additional step of assembling the part.

According to a particular embodiment of the invention, the method comprises a step of machining the green body.

According to a particular embodiment of the invention, the body being provided with an inner face, the deposition step consists in depositing the coating on said inner face.

According to a particular embodiment of the invention, a back of the part is formed of the polymer material during the coating deposition step.

According to a particular embodiment of the invention, the polymer is to be selected from the following list: POM, PA, PUR, PPS, ABS, PC.

According to a particular embodiment of the invention, the hard material is to be selected from materials such as ceramic, silicon nitride, zirconium oxide, sapphire, or alumina.

The invention also relates to an ornamental part, for example for a timepiece, jewellery or telephone, in particular a watch middle, comprising a hard material body and at least one face provided with a polymer material coating, the body defining an inner space.

According to a particular embodiment of the invention, the coating has a functionalised shape.

According to a particular embodiment of the invention, the coating includes a stair-stepped shape, in particular to be able to assemble other portions of a watch case by interlocking.

According to a particular embodiment of the invention, the body defines an internal space, the face bordering said space.

According to a particular embodiment of the invention, the face is an inner face of the body.

According to a particular embodiment of the invention, the part comprises a back obtained during the coating deposition step.

The invention also relates to a watch case comprising such an ornamental part, as well as a crystal and a bezel for holding the glass on the part, the bezel being assembled to the part by the polymer coating.

BRIEF DESCRIPTION OF THE FIGURES

The invention will be better understood with regard to the appended drawing wherein:

FIG. 1 is a block diagram showing the method according to the invention,

FIGS. 2A to 2F show perspective views of a watch middle after each step of the method according to the invention.

DETAILED DESCRIPTION OF THE INVENTION

Figure 3:
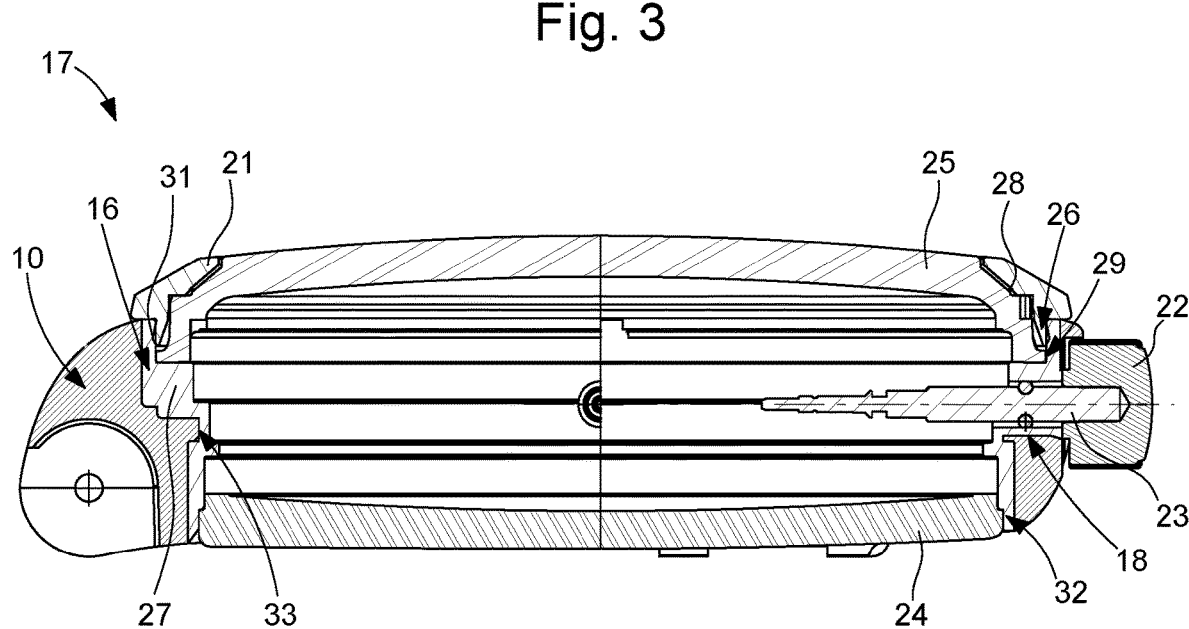
FIG. 3 is a sectional view of an assembled watch case comprising a part according to a first embodiment of the invention.

The method 1 for manufacturing an ornamental part 10, for example for a timepiece, jewellery or telephone, is represented in FIG. 1. The ornamental part is for example a middle of a watch case as shown in FIGS. 2A to 2F, a bezel, a back of a watch case, a stone or a push-piece of a timepiece, a jewellery ring or bracelet, or else a mobile phone cover. The part 10 at least partly comprises a hard material having a Vickers hardness greater than 1000 HV. The hard material is, for example, a ceramic material such as aluminium oxide (Al2O3), zirconium oxide (ZrO2), carbide, nitride, cermet, hard metal or any other material of Vickers hardness greater than 1000 HV.

The method 1 comprises a first step 2 of producing a precursor from a mixture of at least one powder material with a binder. In this context, the ceramic-based powder may include at least one metal oxide, one metal nitride or one metal carbide. For example, the ceramic-based powder may include aluminium oxide in order to form synthetic sapphire or a mixture of aluminium oxide and chromium oxide in order to form synthetic ruby, or else zirconium oxide. In addition, the binder can be of various natures such as, for example, of polymeric types or of organic types.

The method 1 comprises a second step 3 of injecting the precursor into a mould in order to form a green body 12. The mould has substantially the shape of the desired part taking into account a retraction coefficient of the part. The precursor is injected into the mould via a tube, then via circuits for distributing the precursor throughout the mould. The precursor thus takes the shape of the mould, for example a middle of a watch case, as in the examples described in the application. Alternatively, the injection can also be carried out by circular sheet or by channels.

A third step 4 is to machine the green body 12 to remove unnecessary portions of the green body 12 produced by the injection. For example, a tubing 38 or channels 19 formed because of the tube and the distribution circuits are eliminated. Thus, a machined green body 13w is obtained.

The fourth step 5 has the function of sintering said machined green body 13 in order to form a body 14 of the future part from said at least one hard material. Sintering involves heating the precursor so that the powder grains agglomerate. During sintering, the green body 13 hardens by retracting to result in a hard body 14. Preferably according to the invention, the sintering step may include pyrolysis.

An optional fifth step 6 is used to prepare some portions of the body 14 obtained by sintering for the rest of the steps, in particular to prepare the body 10 for the finishing touches.

The method 1 comprises a sixth step 7 of depositing a polymer material coating 16 on one face of the part, the deposition 7 being carried out by overmoulding the body 14, 15, in particular by injection into a mould. A watch case middle is, for example, provided with an inner face 18, which is desired to be covered with a polymer coating 16. The deposition step 7 consists in depositing the coating 16 on said inner face 18. Thus, a hard material part is obtained with a face 18 covered with a polymer material. In this step, the moulding of a polymer material allows to form a coating 16 with more precise dimensions than with a hard material after sintering. Thanks to the method, having to machine the hard material of the part 10 is avoided. It is thus possible to directly form the coating 16 to the appropriate dimensions. Furthermore, the two materials, the hard body and the coating, are assembled inseparably.

The polymer is for example selected from the following list: POM (for polyoxymethylene or polyformaldehyde or polyacetal), PA (for polyamide), PUR (for polyurethane), PPS (for polyphenylene sulphide), ABS (for acrylonitrile butadiene styrene), PC (for polycarbonate).

In a seventh step 8, the polymer material coating 16 can optionally be machined in order to modify some portions, if necessary, in particular to allow the assembly of the other elements of the case.

An eighth step 9 may also be necessary to carry out a satin finishing and/or a polishing of the hard material. Thus, the aesthetic appearance of the middle is improved.

Finally, in a ninth step 11, the part 10 is assembled with other elements by interlocking thanks to the coating 16. For example, if the part 10 is a watch case middle, a watch case 17 is formed by assembling a bezel 21, a crystal 25 and a back to the middle.

In FIGS. 2A to 2F, bodies are shown allowing to end up with the part 10 of a watch case 17 after certain steps of the method 1. After the second injection step, as shown in FIG. 2A, a green body 12 having the shape of the watch middle is obtained. The green body describes a portion of an open cylinder extended on either side by two opposite elements 34, 35 each provided with an attachment system for fastening a bracelet therein. The green body 12 includes an inner face delimiting the inner space of the cylinder portion.

When there are several injection points, the green body 12 is provided with channels 19 connecting the inner face 18 of the green body at a central crossing 36 arranged at the centre of the inner space. Four perpendicular channels 18 join a tubing 38 orthogonal to the channels 18, the tubing 28 passing through the central crossing 36. The channels 18 and the tubing 38 are produced during the injection step, the precursor being injected into a mould via a tube.

These channels 18 and the tubing 38 are removed during the third step of machining the green body 12 to obtain a machined green body 13 shown in FIG. 2B. The green body 12, 13 is not too hard, so that the machining can be carried out without difficulty.

After the sintering step, the body 14 of FIG. 2C retains substantially the same shape with a sintering coefficient, but it is much harder than before. The hard body 14 can then be prepared for finishing if needed, by forming a hard body 15 of FIG. 2D.

In FIG. 2E, the part 10 obtained includes a polymer coating 16 on the inner face 18. The coating 16 has the desired shape with precise dimensions, which are obtained thanks to the overmoulding. The part 10 shown comprises a coating 16 which is in the shape of a stairway from the top of the middle to the bottom. The different stair-steps of the stairway are used to keep elements within the space or near openings, such as the crown at the top or a back at the bottom.

After assembly, the watch case 17, shown in FIG. 2F, comprises a middle on which is assembled a bezel 21 and a crystal 25. The bezel 21 is maintained interlocked in the first stair-step 27 of the coating 16.

Figure 4:
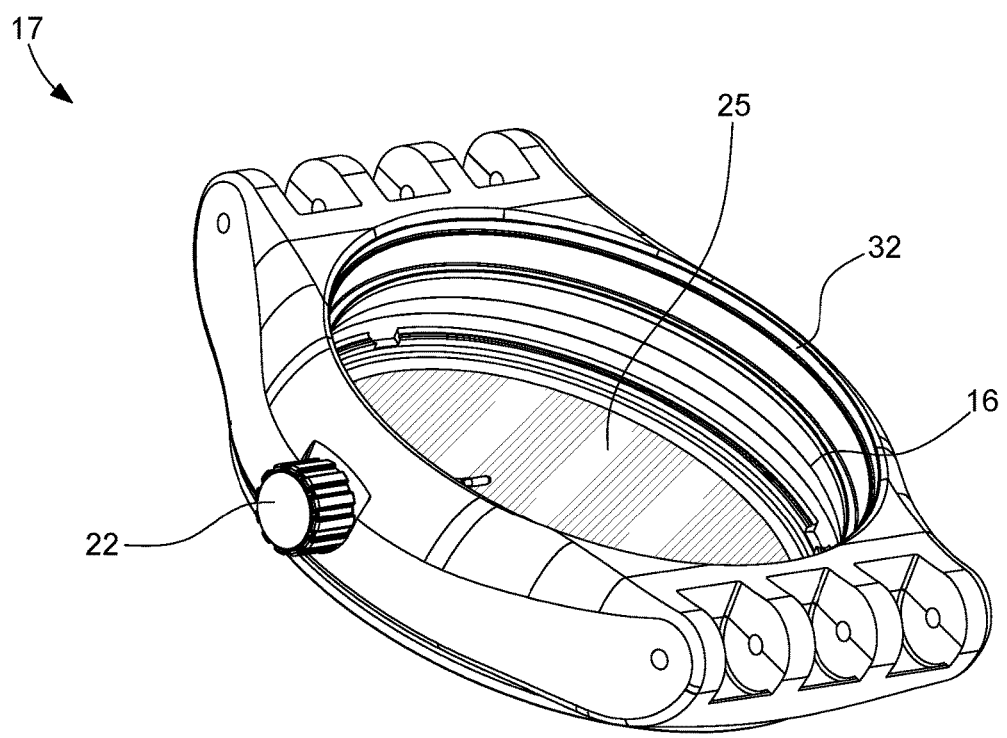
FIG. 4 is an inverted perspective view of a watch part according to the first embodiment of the invention.

FIGS. 3 and 4 show a watch case 17 comprising a hard material part 10, here a middle, with a polymer coating 16 on the inner face 18 of the middle obtained by the method according to the invention, as well as a bezel 21, a crown 22, a stem 23, a back 24 and a crystal 25. The middle has the same shape as that described above. The bezel 21 comprises a collar 26 interlocked into the first stair-step 27 of the coating 16. The bezel 21 rests on the peripheral contour 28 of the crystal 25 to hold it on the middle. The crystal 25 includes a rim 29 at the periphery, which is arranged under the collar 26 of the bezel 21 in the assembly position. The rim 29 rests on the first stair-step 27 of the coating 16 and its end is in contact with the vertical portion 31 of the stair-step 27 of the coating 16.

The back 24 of the case 15 is pressed in the coating 16, the coating 16 including a material removal forming a small stair-step 32 to ensure the holding and water resistance of the back 24.

The part 10 comprises a lug 33 on the inner face to prevent the coating from moving in translation or in rotation. The lug 33 is disposed at mid-height of the part 10.

The crown rod 23 passes through the middle through an orifice to reach the crown 22 arranged outside the part 10.

In a variant of the first embodiment, the back covers the coating to conceal it on the lower face of the middle.

Figure 5:
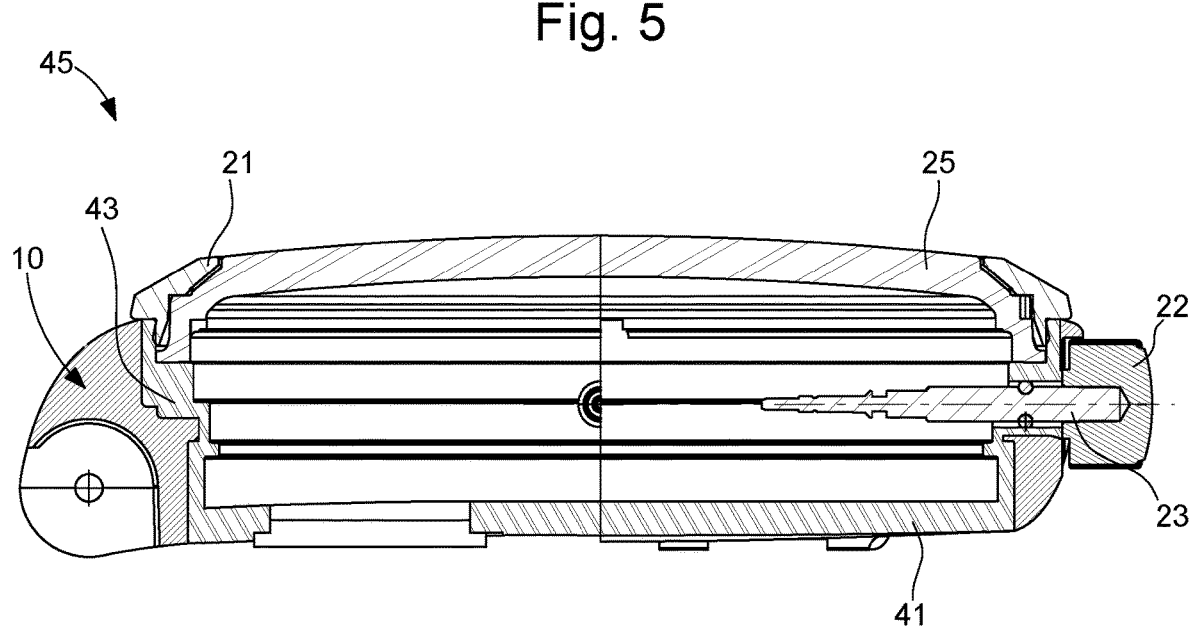
FIG. 5 is a sectional view of an assembled watch case comprising a part according to a second embodiment of the invention.
Figure 6:
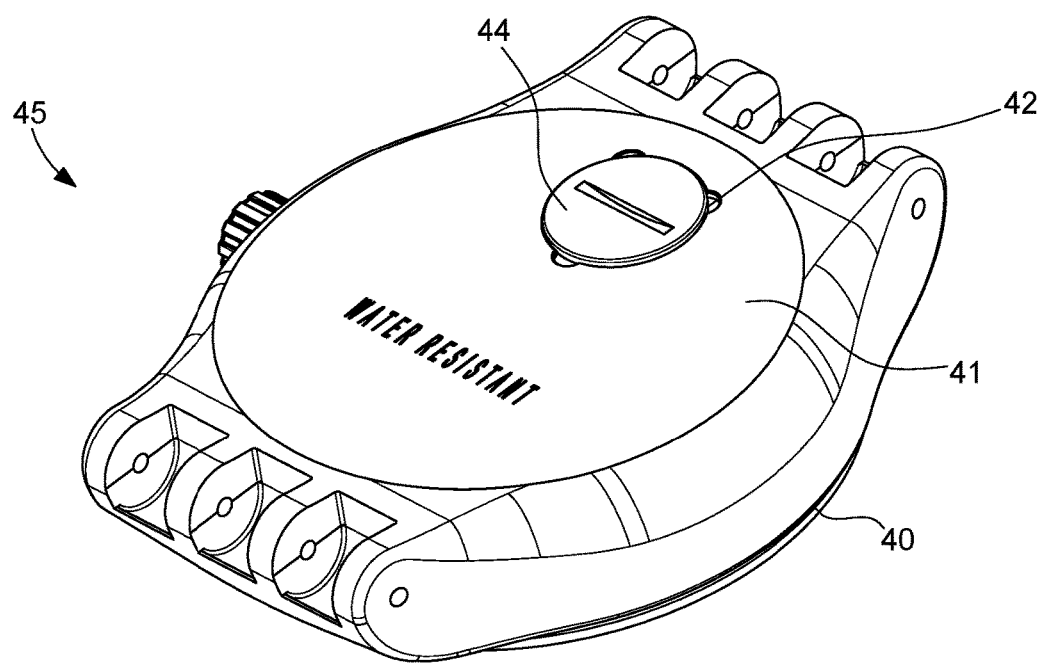
FIG. 6 is an inverted perspective view of a watch part according to the second embodiment of the invention.

A second embodiment of the method consists in forming the back 41 of the case 45 of the same polymer material as the coating 43. The coating 43 and the back 41 are made in one piece and formed during the same deposition step. Thus, the part 40 obtained, shown in FIGS. 5 and 6, comprises a back 41 when the method is finished. The back 41 is not removable and preferably comprises a housing 42 for a battery 44. Apart from the back 41, the other features are the same as those of the middle of the first embodiment.

Other parts can be made using the method described above. Thus, for example, it is possible to manufacture a bezel, a back, a stone or a push-piece of a timepiece, as well as a jewellery ring or bracelet, or else a phone case. All these parts include a hard material body provided with a polymer material coating on at least one face.

The invention claimed is:

1. A method for manufacturing an ornamental part, for a timepiece, the part at least partly comprising a hard material having a Vickers hardness greater than 1000 HV, the method comprising:
   a step of producing a precursor from a mixture of at least one powder material with a binder,
   a step of injecting the precursor into a mould in order to form a green body,
   a step of sintering said green body in order to form a body of the part from said hard material, and
   a step of depositing a polymer material coating on one face of the part, the deposition being carried out by moulding on the body by injection into the mould, the coating and the hard material being inseparable, wherein the polymer material is selected from the following list: POM, PA, PUR, PPS, ABS, PC,
   wherein a back of the part is formed of the polymer material during the coating deposition step such that the back of the part is a back of the timepiece.

2. The method according to claim 1, comprising an additional step of machining the polymer material coating.

3. The method according to claim 1, comprising an additional step of assembling the part.

4. The method according to claim 1, comprising a step of machining the green body.

5. The method according to claim 1, wherein the body is provided with an inner face, the deposition step comprising depositing coating on said inner face.

6. The method according to claim 1, wherein the hard material is to be selected from ceramic, silicon nitride, zirconium oxide, sapphire, or alumina.

* * * * *